United States Patent
Takahashi et al.

(10) Patent No.: US 12,259,710 B2
(45) Date of Patent: Mar. 25, 2025

(54) CONTROL METHOD FOR A SCRAPING MACHINE BASED ON CORRELATION BETWEEN MACHINING FORCE AND DISPLACEMENT

(71) Applicant: CITIZEN WATCH CO., LTD., Nishitokyo (JP)

(72) Inventors: Yosuke Takahashi, Fuchu (JP); Tadashi Mitsuhashi, Tokorozawa (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 404 days.

(21) Appl. No.: 17/597,700

(22) PCT Filed: Jul. 15, 2020

(86) PCT No.: PCT/JP2020/027559
§ 371 (c)(1),
(2) Date: Jan. 19, 2022

(87) PCT Pub. No.: WO2021/015075
PCT Pub. Date: Jan. 28, 2021

(65) Prior Publication Data
US 2022/0276635 A1 Sep. 1, 2022

(30) Foreign Application Priority Data
Jul. 24, 2019 (JP) .................. 2019-136423

(51) Int. Cl.
*G05B 19/4155* (2006.01)
*B26D 3/08* (2006.01)

(52) U.S. Cl.
CPC ......... *G05B 19/4155* (2013.01); *B26D 3/085* (2013.01); *G05B 2219/35519* (2013.01)

(58) Field of Classification Search
None
See application file for complete search history.

(56) References Cited

U.S. PATENT DOCUMENTS

| | | | | |
|---|---|---|---|---|
| 4,602,540 A | * | 7/1986 | Murofushi | G05B 19/39 700/77 |
| 4,744,274 A | * | 5/1988 | Vasquez | B23B 5/14 82/128 |
| 5,331,770 A | | 7/1994 | Ichinohe et al. | |
| 5,575,935 A | * | 11/1996 | Nakata | B23K 26/083 219/121.61 |

(Continued)

FOREIGN PATENT DOCUMENTS

| | | |
|---|---|---|
| CN | 109483556 A | 3/2019 |
| JP | H05123921 A | 5/1993 |
| JP | 2004042164 A | 2/2004 |
| JP | 2016137551 A | 8/2016 |

OTHER PUBLICATIONS

Hsieh et al. 'Design, manufacture, and development of a novel automatic scraping machine' Int J Adv Manuf Technol (2017) 90: 2617-2630, published 2017.*

(Continued)

*Primary Examiner* — Bernard G Lindsay
(74) *Attorney, Agent, or Firm* — KENJA IP LAW PC

(57) ABSTRACT

A machining device for scraping a workpiece is provided. The machining device includes: a drive unit for driving a scraper; a first detection unit for detecting the position of the scraper; a second detection unit for detecting the machining force of the scraper with respect to the workpiece; a first acquisition unit for acquiring information relating to displacement of the scraper; a second acquisition unit for acquiring information relating to the machining force of the scraper; and a control unit for driving the drive unit based on the information relating to the displacement of the scraper by the first acquisition unit and the information relating to the machining force of the scraper acquired by the second acquisition unit, so the displacement and the machining force of the scraper satisfy a prescribed relationship. A control device and a control method for the machining device are also provided.

1 Claim, 7 Drawing Sheets

(56) References Cited

U.S. PATENT DOCUMENTS

| | | | | |
|---|---|---|---|---|
| 2001/0023163 A1* | 9/2001 | Kinbara | ............... | B23K 26/361 |
| | | | | 451/28 |
| 2011/0218668 A1* | 9/2011 | Morfino | ............... | G05B 19/401 |
| | | | | 700/174 |
| 2012/0143369 A1* | 6/2012 | Prust | .................... | G05B 19/404 |
| | | | | 700/179 |
| 2016/0214143 A1* | 7/2016 | Nagatsuka | ............. | B25J 13/085 |
| 2016/0354933 A1 | 12/2016 | Sato | | |

OTHER PUBLICATIONS

Jan. 25, 2022, International Preliminary Report on Patentability issued in the International Patent Application No. PCT/JP2020/027559.

Sep. 15, 2020, International Search Report issued in the International Patent Application No. PCT/JP2020/027559.

M.-H. Liu et al., Applications of the fuzzy logic in automated robotic deburring, Fuzzy Sets and Systems, May 10, 1994, pp. 293-305 vol. 63, Issue 3.

Aug. 18, 2023, Office Action issued by the China National Intellectual Property Administration in the corresponding Chinese Patent Application No. 202080052350.6.

Mar. 22, 2024, Office Action issued by the China National Intellectual Property Administration in the corresponding Chinese Patent Application No. 202080052350.6.

Oct. 29, 2024, Office Action issued by the Korean Intellectual Property Office in the corresponding Korean Patent Application No. 10-2022-7002452.

* cited by examiner

CONTROL METHOD FOR A SCRAPING MACHINE BASED ON CORRELATION BETWEEN MACHINING FORCE AND DISPLACEMENT

TECHNICAL FIELD

This disclosure relates to a machining device for scraping a workpiece, as well as a device and a method for controlling the machining device.

BACKGROUND

Conventionally, there is known a machining device for automatically scraping the work surface of a workpiece, which forms a sliding surface made of metal, such as steel, or a guide rail or a slider used in a machining device.

For example, PTL 1 discloses a machining device that includes a scraper tool (scraper) having a cutting edge adapted to be vibrated by a vibrator, a robot arm for gripping the scraper tool, a camera for imaging the work surface of a workpiece, and a force sensor for measuring the reaction force received by the scraper tool during the machining. In this instance, a large number of convex portions in the work surface are detected by the camera and cut by the scraper tool that is driven by the robot arm, until the reaction force received by the scraper tool is eliminated.

CITATION LIST

Patent Literature

PTL 1: JP 2010-269364 A1

SUMMARY

Technical Problem

In the conventional machining device described in PTL 1, only the reaction force as detected by the force sensor is used as the feedback signal for controlling the operation of the scraper tool by the robot arm. Thus, when the scraper tool is cutting a convex portion of the workpiece, even if the scraper tool is caught on the work surface of the workpiece and stops moving, it is not possible to detect the occurrence of the catch since the reaction force is detected by the force sensor. Hence, when the machining is continued as it is, there may be caused a problem that the work surface of the workpiece is locally scraped excessively by the scraper tool. If the surface of the workpiece is locally scraped excessively by the scraper tool, it is necessary to entirely scrape the surface of the workpiece for carrying out flattening once again, resulting in a significant decrease in productivity.

The present disclosure has been accomplished in view of the problem described above, and it is an object of the present disclosure to provide a machining device capable of scraping a workpiece with high accuracy, a control device used for the same, and a control method for the machining device.

Solution to Problem

According to the present disclosure, there is provided a machining device for scraping a workpiece, the machining device comprising: a drive unit for driving a scraper; a first detection unit for detecting the position of the scraper; a second detection unit for detecting the machining force of the scraper with respect to the workpiece; a first acquisition unit for acquiring information relating to displacement of the scraper, which has been detected by the first detection unit; a second acquisition unit for acquiring information relating to the machining force of the scraper, which has been detected by the second detection unit; and a control unit for driving the drive unit based on the information relating to the displacement of the scraper acquired by the first acquisition unit and the information relating to the machining force of the scraper acquired by the second acquisition unit, so the displacement and the machining force of the scraper satisfy a prescribed relationship.

Preferably, the machining device according to the present disclosure, with the constitution described above, is configured such that the scraping is carried out by cutting the workpiece multiple times, with respect to a plurality of different parts of the workpiece.

Preferably, the machining device according to the present disclosure, with the constitution described above, is configured such that, in each cutting process, the first detection unit detects the displacement of the scraper in a direction parallel to the surface of the workpiece, with the machining start point as a reference position.

Preferably, the machining device according to the present disclosure, with the constitution described above, further comprises a storage unit for storing the correlation between the displacement and the machining force of the scraper, when the workpiece is properly cut by the scraper, wherein the control unit controls the driving unit so that the correlation between the displacement of the scraper acquired by the first acquisition unit and the machining force of the scraper acquired by the second acquisition unit is matched with the correlation stored in the storage unit.

Preferably, the machining device according to the present disclosure, with the constitution described above, is configured such that the control unit controls the operation of the drive unit for changing the height of the scraper with respect to the work surface of the workpiece, whereby the correlation between the displacement of the scraper acquired by the first acquisition unit and the machining force of the scraper acquired by the second acquisition unit is matched with the correlation stored in the storage unit.

Preferably, the machining device according to the present disclosure, with the constitution described above, is configured such that the scraper has an elongate plate shape, wherein the control unit controls the operation of the drive unit for changing the height of a holding unit that holds the scraper, so as to change the height of the scraper with respect to the work surface of the workpiece.

Preferably, the machining device according to the present disclosure, with the constitution described above, is configured such that the control unit controls the operation of the drive unit so as to change the height of the scraper, based on the information relating to the displacement of the scraper acquired by the first acquisition unit and the information relating to the machining force of the scraper acquired by the second acquisition unit.

According to the present disclosure, there is also provided a control device for a machining device that includes a scraper driven by a drive unit, for scraping a workpiece, wherein the control device comprises: a first acquisition unit for acquiring information relating to displacement of the scraper; a second acquisition unit for acquiring information relating to machining force of the scraper with respect to the workpiece; and a control unit for controlling the operation of the drive unit, based on the information relating to the displacement of the scraper acquired by the first acquisition unit, and the information relating to the machining force of the scraper acquired by the second acquisition unit, so that the displacement and the machining force of the scraper satisfy a predetermined relationship.

According to the present disclosure, there is further provided a control method for a machining device that includes a scraper driven by a drive unit for scraping a workpiece, wherein the control method comprises: a first acquisition step for acquiring information relating to displacement of the scraper; a second acquisition step for acquiring information relating to machining force of the scraper with respect to the workpiece; and a control step for controlling the operation of the drive unit, based on the information relating to the displacement of the scraper acquired in the first acquisition step, and the information relating to the machining force of the scraper acquired in the second acquisition step, so that the displacement and the machining force of the scraper satisfy a predetermined relationship.

Advantageous Effect

According to the present disclosure, it is possible to provide a machining device capable of scraping a workpiece with high accuracy, a control device used for the same, and a control method for the machining device.

DETAILED DESCRIPTION

Figure 1:
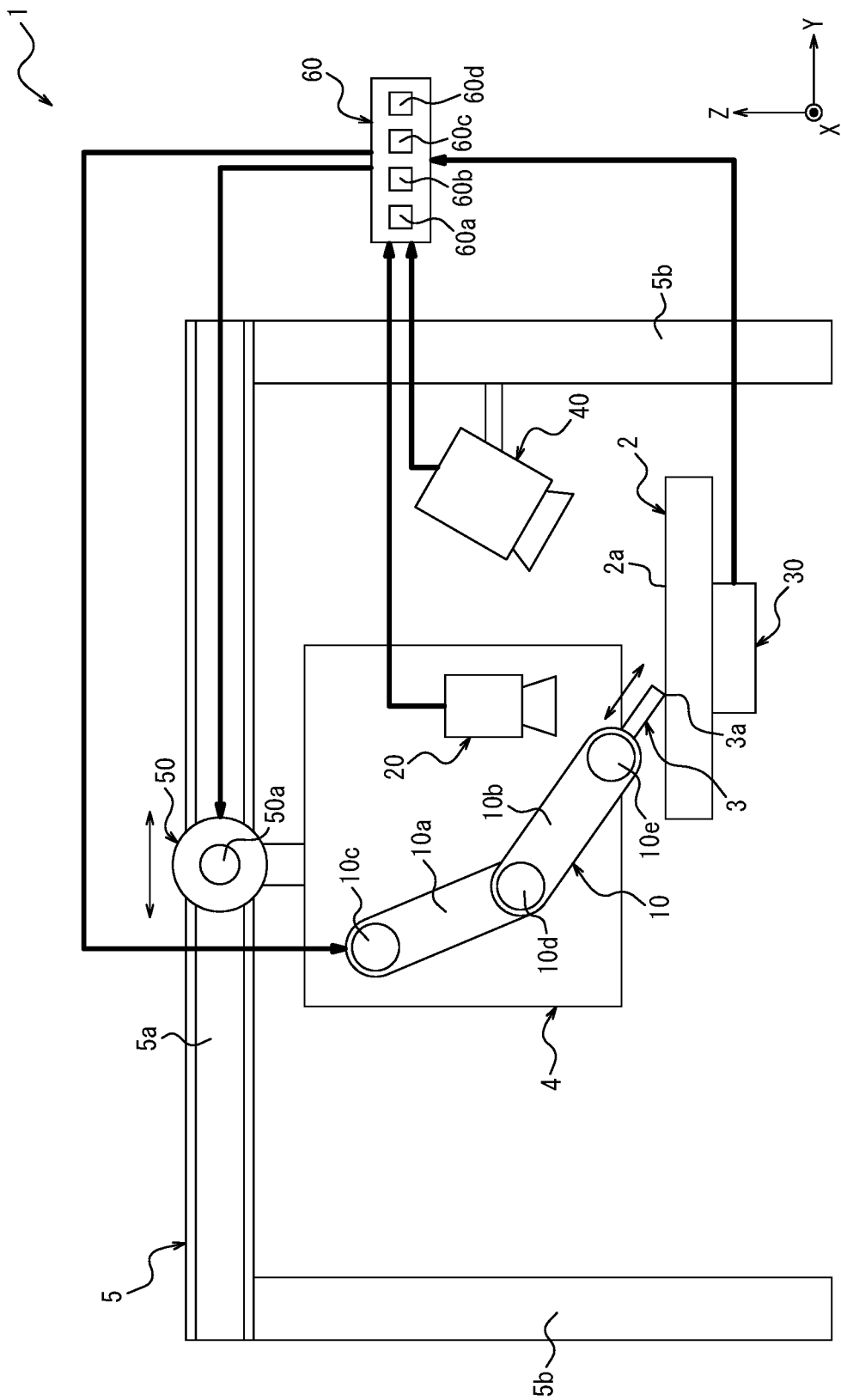
FIG. 1 is a schematic view illustrating the constitution of the machining device according to one embodiment of the present disclosure.

The machining device 1 according to a first embodiment of the present disclosure, as illustrated in FIG. 1, is for automatically scraping the work surface 2a of the workpiece 2 made of a metal, such as steel material.

The machining device 1 is configured to carry out scraping of the surface of the 2a of the workpiece 2, by using a scraper 3 as a cutting tool for cutting fine uneven convex portions on the surface 2a of the workpiece 2 installed on a pedestal or the like so as to leave appropriate concave portions, and by carrying out cutting with respect to the entire convex portions on the work surface 2a (a plurality of convex portions at a plurality of different locations on the work surface 2a). The workpiece 2 scraped by the machining device 1 may be, for example, a metal (steel) member having a sliding surface, such as a guide rail or a slider used in a machine tool.

In the present embodiment, when the scraper 3 cuts the convex portion of the work surface 2a of the workpiece 2, the feed direction of the scraper 3 with respect to the workpiece 2 is defined as the Y-axis direction, the direction perpendicular (vertical) to the work surface 2a of the workpiece 2 is defined as the Z-axis direction, and the direction perpendicular to the Y-axis direction and the Z-axis direction is defined as the X-axis direction.

The machining device 1 includes a robot arm 10 that is supported by a base 4 as a driving unit for driving the scraper 3.

The robot arm 10 is a multi-articulated robot provided with a pair of arm portions 10a and 10b and three rotation portions 10c, 10d and 10e. The arm portion 10a is rotatably connected to the base 4 by the rotation portion 10c, and the arm portion 10b is rotatably connected to the arm portion 10a by the rotating portion 10d. The scraper 3 has an elongated plate shape, and is fixedly held by the tip (holding part) of the arm portion 10b at the root side portion, and is rotatable with respect to the arm portion 10b about the rotation portion 10e. By rotating each of the rotation portions 10c, 10d, and 10e by means of a drive source, such as a servomotor, so as to change the horizontal position and height of the tip (holding part) of the arm portion 10b that holds the scraper 3, the robot arm 10 serves to drive the scraper 3 for movement in the Y-axis direction (feed direction) and the Z-axis direction (vertical direction). The robot arm 10 having such a configuration allows the scraper 3 to carry out cutting. In addition to the cutting operation, the robot arm 10 also allows the scraper 3 to be moved in the vertical direction, in order to adjust the height of the scraper 3 (i.e., the cutting amount with respect to the workpiece 2) in the cutting operation. The height of the scraper 3 in the cutting operation may be the height of the portion of the scraper 3 held by the holding part of the robot arm 10. By changing the height of the portion of the scraper 3 held by the holding part of the robot arm 10 in the cutting operation, and thereby changing the bending amount of the cutting edge 3a of the scraper 3 in contact with the work surface 2a of the workpiece 2, with respect to the holding part, it is possible to finely adjust the bending amount of the cutting edge 3a with respect to the workpiece 2.

The machining device 1 includes a first detection unit, which is in the form of a camera 20 for imaging the scraper. The camera 20 is attached to the base 4. The camera 20 serves to capture the image of the scraper 3 that is driven by the robot arm 10 and detect the displacement (actual position) of the scraper 3 from the reference position from the captured image data by using a technique such as image recognition. In the present embodiment, the camera 20 detects the displacement of the scraper 3 from the reference position (machining start point) in the Y-axis direction parallel to the surface of the workpiece 2. In this case, the reference position for the displacement of the scraper 3 may be, for example, the position in the X-Y plane when the scraper 3 first comes into contact with the work surface 2a, before the cutting operation (i.e., the position in the coordinate system, including the X-axis component and the Y-axis component). In addition to the displacement in the Y-axis direction, the camera 20 may be configured to detect the displacement of the scraper 3 in the Z-axis direction and the displacement in the X-axis direction from the reference position. In this case, the reference position for the displacement of the scraper 3 may be a position in the coordinate system including the Z-axis component, in addition to the X-axis component and the Y-axis component.

The machining device 1 includes a second detection unit, which is in the form of a force sensor 30. The force sensor 30 is configured to detect the machining force of the scraper 3 with respect to the workpiece 2. In the present embodiment, as the force sensor 30, there may be used a sensor that is capable of detecting the machining force of the scraper 3 with respect to the workpiece 2, in the Y-axis direction and the Z-axis direction.

The machining device 1 includes a camera 40 for capturing the image of the workpiece 2. The camera 40 is attached to a pillar portion 5b of the support frame 5, and serves to capture the image of the entirety of the work surface 2a of the workpiece 2 and detect, from the captured image data, the position of the convex portions (i.e., the cutting point that is to be cut by the scraper 3) on the work surface 2a by using such technology as image recognition.

The machining device 1 includes a moving mechanism 50 for moving the base 4. The moving mechanism 50 has a moving body 50a that is movable along a rail portion 5a of the support frame 5, and the base 4 is attached to the moving body 50a. The moving mechanism 50 is adapted to move the base 4 in the Y-axis direction, by moving the moving body 50a along the rail portion 5a. That is, the moving mechanism 50 is adapted to move the scraper 3, which is driven by the robot arm 10, in the Y-axis direction toward each cutting point of the work surface 2a, together with the robot arm 10 and the camera 20.

The moving mechanism 50 may be configured such that the base 4 and the robot arm 10 are moved not only in the Y-axis direction, but also in the X-axis direction (for example, as an X-Y table mechanism). By this, the scraper 3 driven by the robot arm 10 can be moved to an arbitrary cutting point on the entire work surface 2a of the workpiece 2. Further, the moving mechanism 50 may be configured to include a rotating mechanism for rotating the base 4 about the Z axis with respect to the moving body 50a. By this, the cutting direction (moving direction) of the scraper 3 driven by the robot arm 10 can be changed, and an arbitrary position of the work surface 2a of the workpiece 2 can be cut from an arbitrary direction.

The machining device 1 includes a control device 60. The robot arm 10, the camera 20, the force sensor 30, the camera 40, and the moving mechanism 50 are each connected to the control device 60.

The control device 60 includes a first acquisition unit 60a, a second acquisition unit 60b, a control unit 60c and a storage unit 60d.

The first acquisition unit 60a is adapted to acquire information relating to the displacement (position information) of the scraper 3, based on the data input from the camera 20. Based on the information relating to the displacement of the scraper 3 acquired by the first acquisition unit 60a, the control device 60 is capable of recognizing the correlation between the displacement of the scraper 3 from the reference position in the Y-axis direction and time, as illustrated in FIG. 2A.

The second acquisition unit 60b is adapted to acquire information relating to the machining force of the scraper 3 with respect to the workpiece 2, based on the data input from the force sensor 30. Based on the information relating to the machining force of the scraper 3 acquired by the second acquisition unit 60b, the control device 60 is capable of the correlation between the machining force of the scraper 3 and time, as illustrated in FIG. 2B, when the scraper 3 is driven by the robot arm 10 to perform the cutting operation.

Further, the control device 60 is configured such that when the scraper 3, before the cutting process, first comes into contact with the work surface 2a, the second acquisition unit 60b recognizes the contact pressure as the machining force, so as to set the reference position of the scraper 3.

Figure 2A:
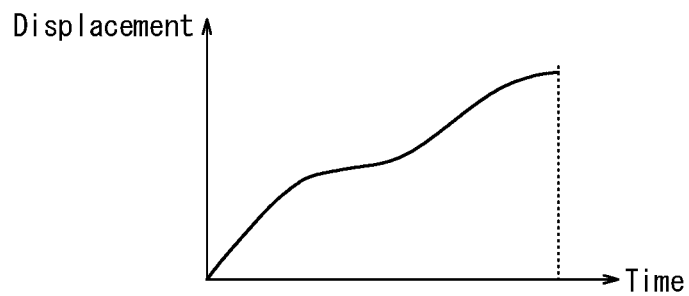
FIG. 2A is a characteristic diagram which illustrates the correlation between the displacement of a scraper and time.
Figure 2B:
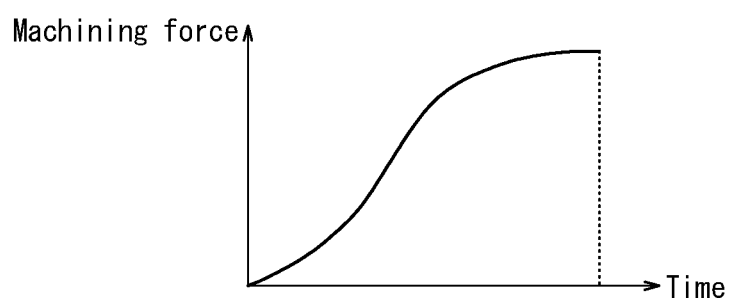
FIG. 2B is a characteristic diagram which illustrates the correlation between the machining force of the scraper and time.
Figure 2C:
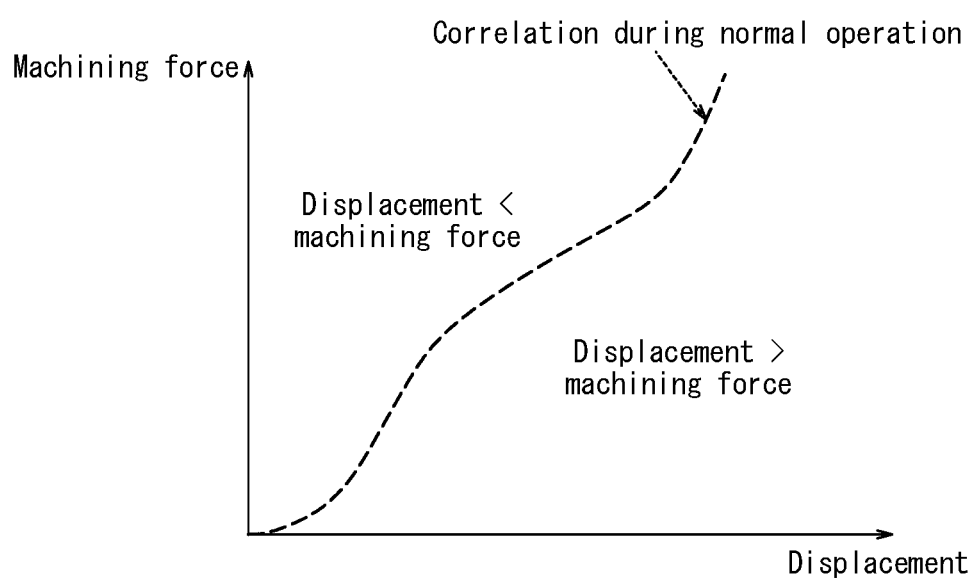
FIG. 2C is a characteristic diagram which illustrates the correlation between the displacement of the scraper tool and the machining force.

Further, the control device 60 is capable to recognize the correlation between the displacement and the machining force of the scraper 3 as illustrated in FIG. 2C, based on the correlation between the displacement of the scraper 3 and time, as illustrated in FIG. 2A, and the correlation between the machining force of the scraper 3 and time, as illustrated in FIG. 2B. FIG. 2C illustrates the correlation between the displacement and the machining force of the scraper 3 when the cutting of the workpiece 2 is normally carried out by the scraper 3. In the characteristic diagram illustrated in FIG. 2C, the upper side of the broken line illustrating the correlation indicates the region where the displacement is small with respect to the machining force in contrast to the normal state, due to the scraper 3 being caught or deeply dug with respect to the workpiece 2. The lower side of the broken line illustrating the correlation indicates the region where the machining force is small with respect to the displacement in contrast to the normal state, due to the scraper 3 causing a swing and miss or shallow digging with respect to the workpiece 2.

The control unit 60c is adapted to control the operation of the robot arm 10 so that the scraper 3 carries out a cutting operation.

The storage unit 60d is adapted to store: the data input from the camera 20, the force sensor 30, the camera 40, etc.; a program for allowing the control unit 60c to control the robot arm 10 so that the scraper 3 carries out the cutting process; and further data, such as calculation results calculated the by the control unit 60c. Moreover, when the convex portion on the work surface 2a of the workpiece 2 is normally cut by the scraper 3 that is driven by the robot arm 10, the storage unit 60d is adapted to store the correlation between the displacement of the scraper 3 with respect to the reference position of the scraper 3 during the cutting and the machining force, as a normal correlation.

In the machining device 1 of the present embodiment, in order to control the operation of the robot arm 10 for causing the scraper 3 to carry out the cutting process, the control unit 60c is configured to control the operation of the robot arm 10 based on the displacement of the scraper 3 as detected by the camera 20 and the machining force as detected by the force sensor 30, such that, while the scraper 3 carries out the cutting process with respect to the workpiece 2, the scraper 3 continues generation of the machining force and movement.

The control by means of the control unit 60c is carried out by controlling the operation of the robot arm 10 based on the information relating to the displacement of the scraper 3 as acquired by the first acquisition unit 60a and the information relating to the machining force of the scraper 3 as acquired by the second acquisition unit 60b, such that the displacement and the machining force of the scraper 3 satisfy a predetermined relationship.

More specifically, the control unit 60c is configured to control the operation of the robot arm 10 during the cutting process, such that the correlation obtained from the information relating to the displacement of the scraper 3 as detected by the camera 20 and the information relating to the machining force of the scraper 3 as detected by the force sensor 30 is matched with the correlation between the displacement and the machining force of the scraper 3 obtained when the cutting process is normally carried out and stored in the storage unit 60d.

In the control described above, the control unit 60c controls the operation of the robot arm 10 so as to change the height of the scraper 3 with respect to the work surface 2a of the workpiece 2, such that the correlation between the displacement and the machining force during the cutting process is adjusted to be matched with the normal correlation stored in the storage unit 60d.

For example, if the correlation between the displacement of the scraper 3 and the machining force during the cutting process is changed from the correlation between the displacement of the scraper 3 and the machining force in the normal state stored in the storage unit 60d, in a direction in which the displacement of the scraper 3 becomes smaller with respect to the machining force, then the control unit 60c determines that the scraper 3 is caught in the workpiece 2 or an excessive digging has occurred, and controls the operation of the robot arm 10 so as to raise the height of the scraper 3 with respect to the work surface 2a of the workpiece 2. By increasing the height of the scraper 3, for example, the deflection of the scraper 3 due to the reaction force received from the workpiece 2 is reduced, thereby reducing the cutting amount or pressing force at the cutting edge 3a of the scraper 3 with respect to the workpiece 2 so as to eliminate the catching or excessive cutting of the scraper 3 with respect to the workpiece 2. The control is repeatedly executed until the correlation between the displacement and the machining force of the scraper 3 carrying out the cutting process is matched with the correlation stored in the storage unit 60d.

Conversely, if the correlation between the displacement and the machining force of the scraper 3 during the cutting process is changed from the correlation between the displacement and the machining force of the scraper 3 in the normal state stored in the storage unit 60d, in a direction in which the machining force of the scraper 3 becomes smaller with respect to the displacement, then the control unit 60c determines that a missing swing of the scraper 3 or insufficient digging with respect to the workpiece 2 has occurred, and controls the operation of the robot arm 10 so as to lower the height of the scraper 3 with respect to the work surface 2a of the workpiece 2. By lowering the height of the scraper 3, for example, the deflection of the scraper 3 due to the reaction force received from the workpiece 2 is increased, thereby increasing the cutting amount or pressing force at the cutting edge 3a of the scraper 3 with respect to the workpiece 2 so as to eliminate the missing swing or shallow digging with respect to the workpiece 2. The control is repeatedly executed until the correlation between the displacement and the machining force of the scraper 3 carrying out the cutting process is matched with the correlation stored in the storage unit 60d.

In the above control, the control unit 60c may be configured to control the operation of the robot arm 10 so as to change the height of the tip (holding unit) of the arm unit 10b that holds the scraper 3, thereby controlling the height of the scraper 3 with respect to the work surface 2a of the workpiece 2. By this, the machining force can be changed by changing the bending amount (deflection amount) of the scraper 3 in contact with the work surface 2a of the workpiece 2 at the tip, so that the machining force of the scraper 3 with respect to the workpiece 2 can be finely adjusted. Further, in the above control, the control unit 60c may be configured to control the operation of the robot arm 10 so as to change the height of the tip (holding unit) of the arm unit 10b that holds the scraper 3, within a range in which the cutting edge 3a of the scraper 3 is maintained in contact with the work surface 2a of the workpiece 2.

The control unit 60c is not limited to a configuration in which the operation of the robot arm 10 is controlled so that the correlation between the displacement and the machining force of the scraper 3 during the cutting process is completely matched with the correlation stored in the storage unit 60d. The operation of the robot arm 10 may be controlled such that the correlation between the displacement and the machining force of the scraper 3 during the cutting process is within a predetermined range set in advance with respect to the normal correlation stored in the storage unit 60d. It is also possible to control.

Next, the procedure or method of controlling the machining device 1 having the above configuration, for scraping the work surface 2a of the workpiece 2 will be described.

Figure 3:
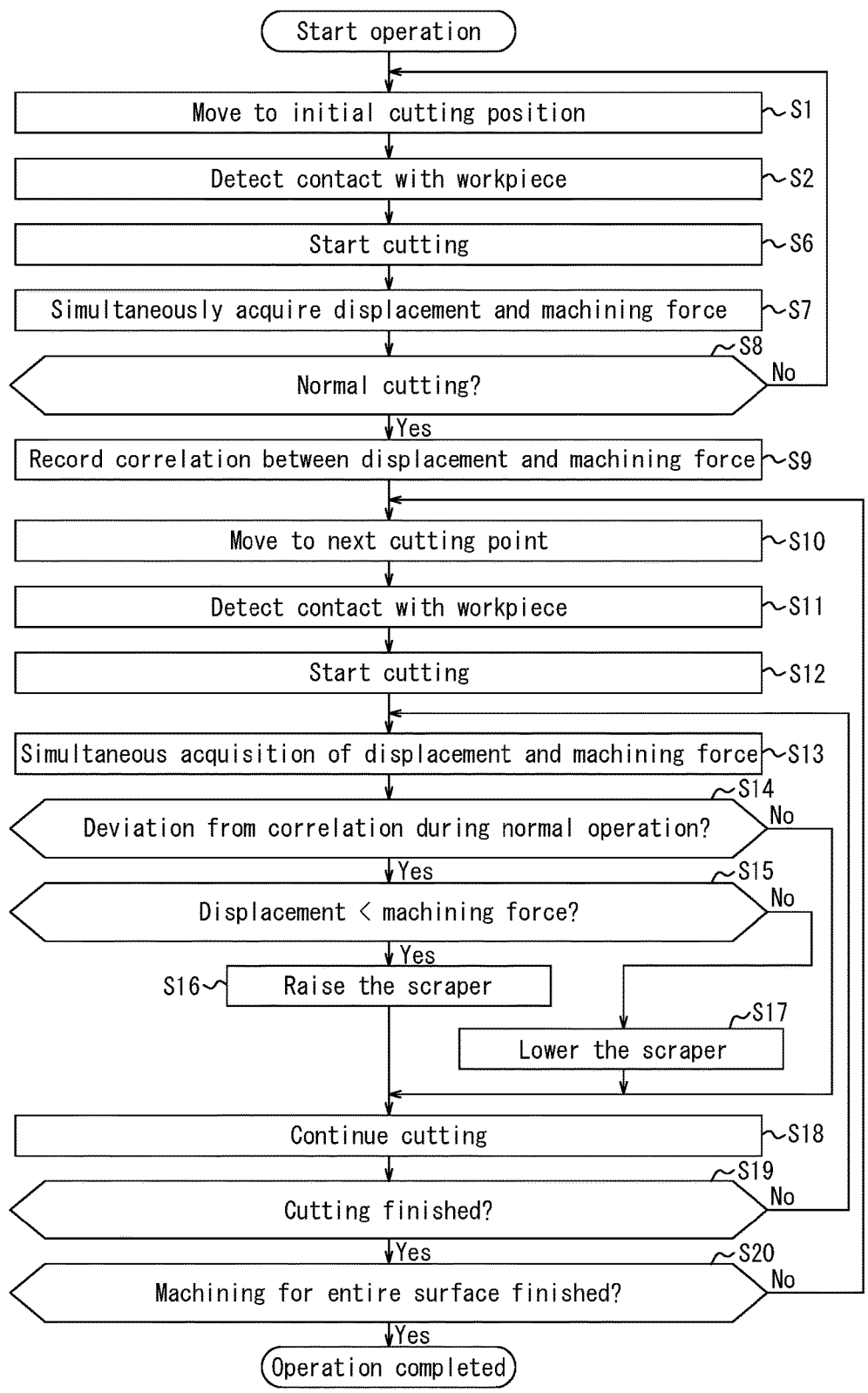
FIG. 3 is a flow chart which illustrates the procedure for controlling the machining device of the first embodiment illustrated in FIG. 1.

First of all, as illustrated in FIG. 3, the control unit 60c drives the base 4 by the moving mechanism 50 to thereby move the robot arm 10, the scraper 3 and the camera 20 together with the base 4, up to the initial cutting point (step S1).

Figure 4:
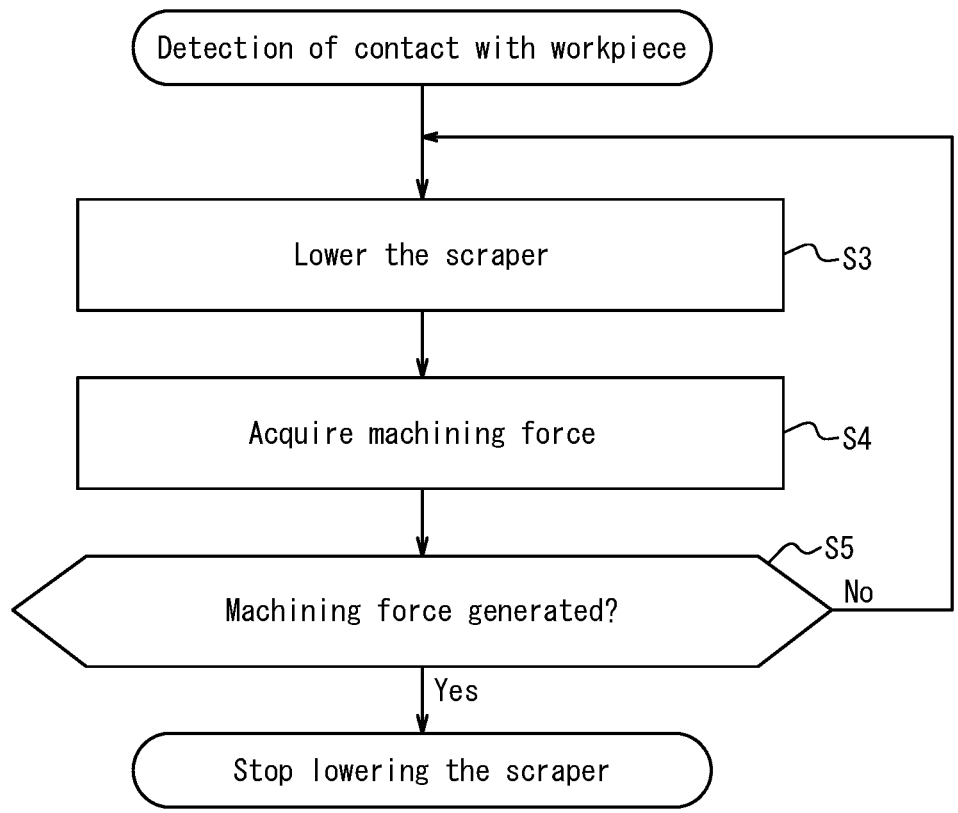
FIG. 4 is a flowchart which illustrates the control procedure of detecting contact with the workpiece in FIG. 3.

Next, the control unit 60c executes a work contact detection for detecting that the cutting edge 3a of the scraper 3 has come into contact with the work surface 2a of the workpiece 2 (step S2). In the work contact detection, as illustrated in FIG. 4, the control unit 60c operates the robot arm 10 to lower the scraper 3 toward the work surface 2a (step S3), and the second acquisition unit 60b of the control device 60 acquires the information relating to the machining force from the force sensor 30 (step S4), If the second acquisition unit 60b acquires the information relating to the machining force from the force sensor 30 from the force sensor 30, and the control unit 60c determines that the machining force has been generated (step S5), the control unit 60c determines that the cutting edge 3a of the scraper 3 is brought into contact with the work surface 2a of the workpiece 2. When the control unit 60c determines that the cutting edge 3a of the scraper 3 is in contact with the work surface 2a of the workpiece 2, the control unit 60c stops the lowering of the scraper 3 and finishes the work contact detection.

When, as a result of the work contact detection, it is determined that the cutting edge 3a of the scraper 3 is in contact with the work surface 2a of the workpiece 2, and the control unit 60c recognizes the position of the scraper 3 at this time as a reference position.

Next, as illustrated in FIG. 3, the control unit 60c drives the scraper 3 by means of the robot arm 10, and starts the cutting process with respect to the convex portion on the work surface 2a by means of the scraper 3 (step S6). In the cutting process, the control unit 60c may be configured to move the scraper 3 only in the Y-axis direction to cut the convex portion of the work surface 2a of the workpiece 2, or to move the scraper 3 in the Y-axis direction and also in the vertical direction so as to scoop the convex portion on the work surface 2a of the workpiece 2.

When the scraper 3 starts the cutting process with respect to the convex portion on the work surface 2a, the first acquisition unit 60a acquires the displacement of the scraper 3 detected by the camera 20, and the second acquisition unit 60b acquires the machining force of the scraper 3 detected by the sensor 30 (step S7). The acquisition of the displacement and the machining force of the scraper 3 in step S7 is repeated continuously, at predetermined time intervals from the start of cutting of the convex portion on the work surface 2a by means of the scraper 3 to the end of the cutting in step S6.

Next, the control unit 60c determines whether or not the cutting process started in step S6 has been carried out normally (step S8). The determination may be made by comparing the displacement and the machining force of the scraper 3 simultaneously acquired in step S7, with the displacement and the machining force of the scraper 3 simultaneously acquired in the normal cutting process obtained through experiments or the like. Alternatively, the determination may be made based on operator's visual inspection of the cut portion of the work surface 2a.

If the control unit 60c determines in step S8 that the cutting process has been carried out normally, the control unit 60c records in the storage unit 60d the correlation between the displacement and the machining force of the scraper 3 simultaneously acquired in the cutting process, as the correlation between the displacement and the machining force of the scraper 3 in the normal state (step S9).

It is noted that, if the control unit 60c does not determine in step S8 that the cutting process has been carried out normally, the control unit 60c returns to step S1 and repeats steps S1 to S7 until it is determined that the cutting process has been carried out normally.

When the correlation between the displacement and the machining force of the scraper 3 in the normal state has been recorded (stored) in the storage unit 60d, the control unit 60c then drives the base 4 by the moving mechanism 50 to drive the robot arm 10 so that the scraper 3 and the camera 20 are moved to the next cutting point together with the base 4 (step S10).

Subsequently, the control unit 60c carries out the same work contact detection (step S11) as in step S2 to set the reference position of the scraper 3 and then, at the cutting point, the scraper 3 starts the cutting process with respect to the convex portion on the work surface 2a (step S12). Also in this cutting process, the control unit 60c may be configured to move the scraper 3 only in the Y-axis direction to cut the convex portion on the work surface 2a of the workpiece 2, or to move the scraper 3 in the Y-axis direction and also in the vertical direction so as to scoop the convex portion on the work surface 2a of the workpiece 2.

When the cutting process is started in step S12, the first acquisition unit 60a acquires the position or displacement of the scraper 3 detected by the camera 20, as the first acquisition step, and the second acquisition unit 60b acquires the machining force of the scraper 3 detected by the force sensor 30, as the second acquisition step (step S13).

Then, the control unit 60c determines whether or not the correlation between the displacement and the machining force of the scraper 3 acquired in step S13 is deviating from the correlation between the displacement and the machining force of the scraper 3 in the normal state, as recorded in step S9 (step S14).

If it is determined in step S14 that the correlation between the displacement and the machining force of the scraper 3 acquired in step S13 is deviating from the correlation between the displacement and the machining force of the scraper 3 in the normal state recorded in step S9, then the control unit 50c further determines whether or not the deviation is in a direction in which the displacement becomes smaller with respect to the machining force (step S15).

Subsequently, if it is determined in step S15 that the correlation between the displacement and the machining force of the scraper 3 acquired in step S13 is deviating from the correlation between the displacement and the machining force of the scraper 3 in the normal state, as recorded in step S9, in a direction in which the displacement is becoming smaller with respect to the machining force, then the control unit 60c controls the operation of the robot arm 10 in the direction of increasing the height of the scraper 3 (step S16). Conversely, if it is not determined in step S15 that the correlation between the displacement and the machining force of the scraper 3 acquired in step S13 is deviating from the correlation between the displacement and the machining force of the scraper 3 in the normal state, as recorded in step S9, in a direction in which the displacement becomes smaller than the machining force, then the control unit 60c controls operation of the robot arm 10 in the direction of lowering the height of the scraper 3 (step S17). In steps S16 and S17, the control unit 60c controls the operation of the robot arm 10 so as to change the height of the tip (holding portion) of the arm portion 10b that holds the scraper 3, within a range in which the cutting edge 3a of the scraper 3 is maintained in contact with the work surface 2a of the workpiece 2. This control is repeated until the control unit 60c determines in step S14 that the correlation between the displacement and the machining force of the scraper 3 acquired in step S13 is not deviating from the correlation between the displacement and the machining force of the scraper 3 in the normal state, as recorded in step S9.

After carrying out the control step consisting of the above steps S14 to S17, the control unit 60c further continues the cutting process by means of the scraper 3 (step S18), and repeatedly executes steps S14 to S18 until the control unit 60c in step S19 determines that the cutting process has been completed.

When it is determined in step S19 that the cutting process has been completed, the control unit 60c repeatedly executes steps S10 to S19, until it is determined in step S20 that the cutting process has been completed multiple times with respect to a plurality of different locations on the entire work surface 2a of the workpiece 2. Further, when the control unit 60c determines in step S20 that the cutting has been completed multiple times with respect to a plurality of different locations on the entire work surface 2a of the workpiece 2, the scraping process is now finished.

As described above, in the machining device 1 of the present embodiment, the control device 60 is configured to control the operation of the robot arm 10 based on the displacement of the scraper 3 detected by the camera 20 and the machining force of the scraper 3 detected by the force sensor 30, such that, while scraping is being carried out, the scraper 3 generates a scraping force and keeps moving. Therefore, even if the scraper 3 is caught on the workpiece 2, it is possible to detect and eliminate catch of the scraper 3 on the workpiece 2. By this, the workpiece 2 can be prevented from being unexpectedly deeply dug by the scraper 3 and thereby realize highly accurate scraping of the workpiece 2.

Further, in the machining device 1 of the present embodiment, the correlation between the displacement and the machining force of the scraper 3 when the workpiece 2 is normally cut by the scraper 3 is recorded in the storage unit 60d, and the subsequent cutting process is carried out by controlling the robot arm 10 such that the correlation between the displacement of the scraper 3 detected by the camera 20 and the machining force of the scraper 3 detected by the force sensor 30 is matched with the correlation between the displacement and the machining force at the normal time, as stored in the storage unit 60d. Therefore, the above control can be carried out accurately with a simple configuration.

Further, in the machining device 1 of the present embodiment, by controlling the operation of the robot arm 10 so as to change the height of the scraper 3 with respect to the work surface 2a of the workpiece 2, the correlation between the displacement of the scraper 3 detected by the camera 20 and the machining force of the scraper 3 detected by the force sensor 30 is matched with the correlation stored in the storage unit 60d. Therefore, the configuration is simple in constitution and highly accurate, making it possible to prevent the scraper from being caught in the workpiece 2 and deep digging, and also from shallow digging with respect to the workpiece 2.

Figure 5:
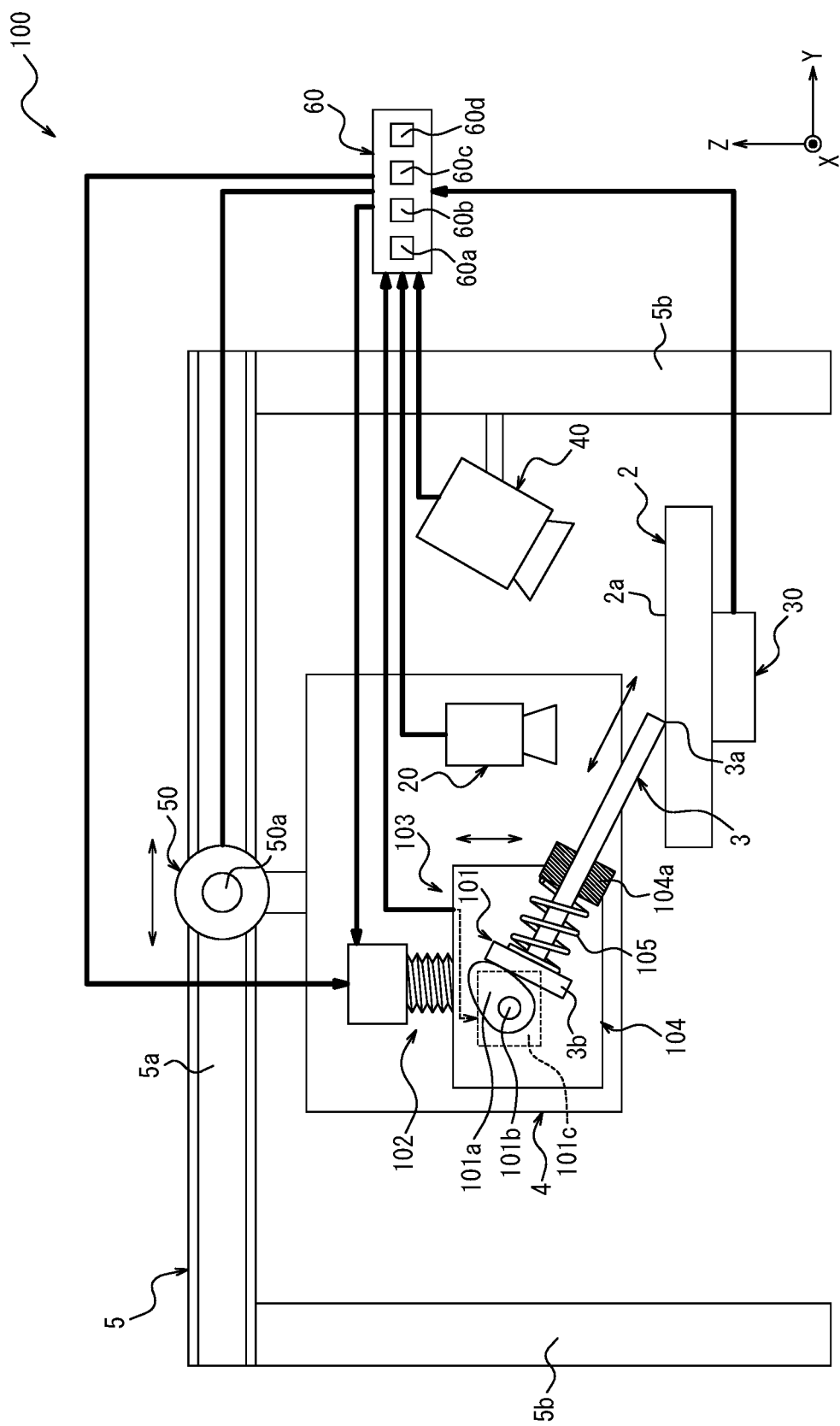
FIG. 5 is explanatory view schematically illustrates the structure of the machining device according to the second embodiment of this disclosure.

FIG. 5 is an explanatory diagram schematically illustrating the configuration of the machining device 100 according to the second embodiment of the present disclosure. It is noted that, in FIG. 5, the members corresponding to the above-mentioned members are designated by the same reference numerals.

The machining device 100 of the second embodiment illustrated in FIG. 5 includes a driving device 103 having a cam mechanism 101 and a ball/screw mechanism 102 as a driving unit for driving the scraper 3, instead of the robot arm 10 in the machining device 1.

The drive device 103 has a support 104, and a cam mechanism 101 is provided on the support 104. The scraper 3 has a straight rod shape having a cutting edge 3a at its tip, and is supported by the guide portion 104a of the support 104 in a posture in which the cutting edge 3a faces the work surface 2a of the workpiece 2. The scraper 3 is guided by the guide portion 104a so as to be movable forward and backward in the axial direction thereof. A plate-shaped body 3b is fixed to the base end of the scraper 3 opposite to the cutting edge 3a, and a spring 105 is arranged between the plate-shaped body 3b and the guide portion 104a. The spring 105 urges the scraper 3 in a direction the cutting edge 3a thereof is separated from the work surface 2a of the workpiece 2.

The cam mechanism 101 has a cam 101a that is rotatably supported by the support 104. The cam 101a is in contact with the plate-shaped body 3b. The cam 101a is fixed to the drive shaft 101b, and the drive shaft 101b is rotationally driven by a drive source 101c such as an electric motor so as to be driven for rotation about the drive shaft 101b. When the cam 101a is rotated, the scraper 3 moves in the front-rear direction along the axial direction.

A ball/screw mechanism 102 is provided between the base 4 and the support 104, so that the support 104 can be vertically moved with respect to the base 4.

The drive source 101c of the cam mechanism 101 and the ball/screw mechanism 102 are each connected to the control device 60, and the operation thereof is controlled by the control device 60. The control device 60 controls the drive source 101c of the cam mechanism 101 and the ball screw mechanism 102 so that the height of the scraper 3 is adjusted by the ball/screw mechanism 102 while the scraper 3 is moving in the advancing direction by the cam mechanism 101. By such a control, the scraper 3 can be made to carry out the cutting process.

Furthermore, the control device 60 may be configured to control the operation of the ball/screw mechanism 102 and move the scraper 3 in the vertical direction, separately from the cutting operation, in order to adjust the height of the scraper 3 (i.e., the cutting amount with respect to the workpiece 2) in the cutting operation.

Figure 6A:
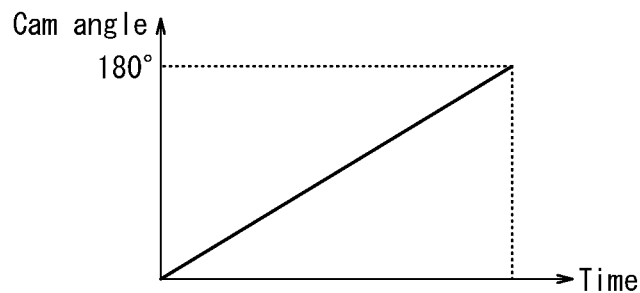
FIG. 6A is a characteristic diagram which illustrates the correlation between the cam angle and time.
Figure 6B:
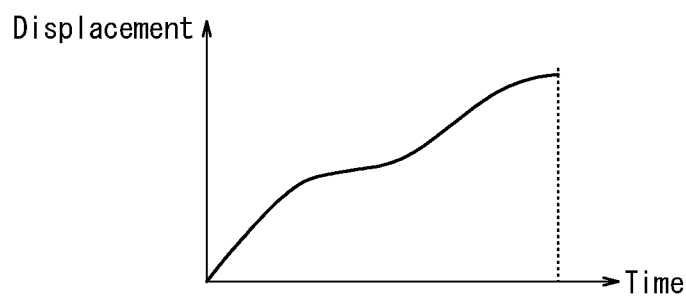
FIG. 6B is a characteristic diagram which illustrates the correlation between the displacement of the scraper and time.
Figure 6C:
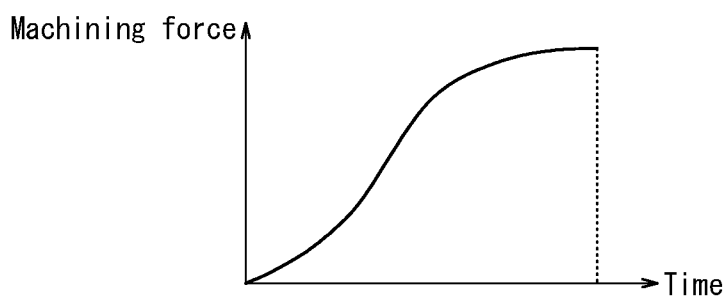
FIG. 6C is a characteristic diagram which illustrates the correlation between the machining force of the scraper and time.
Figure 6D:
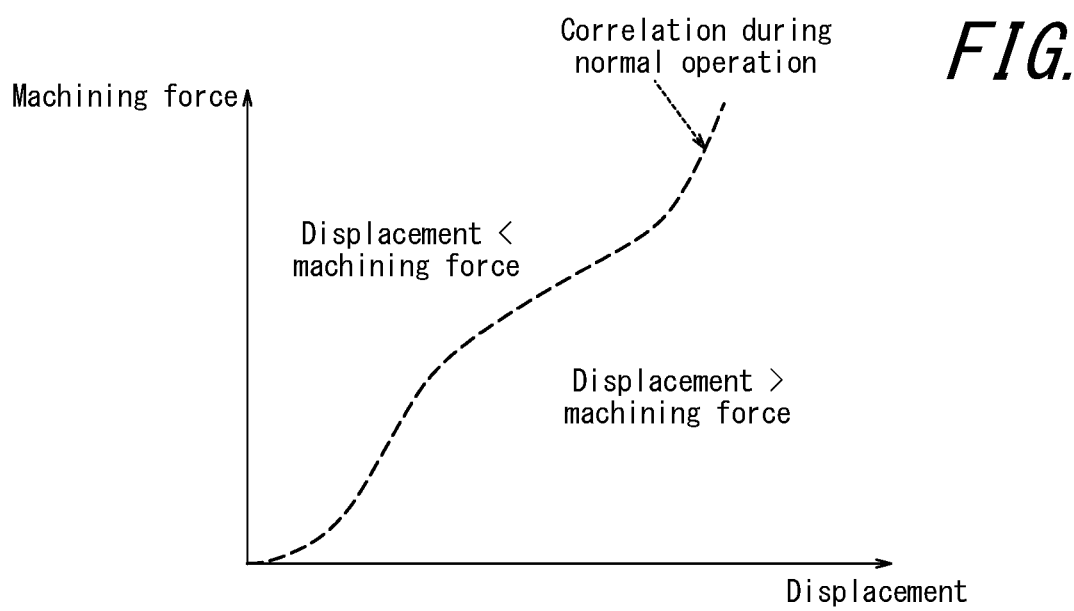
FIG. 6D is a characteristic diagram which illustrates the correlation between the displacement of a scraper and the machining force.

As illustrated in FIG. 6A, the cam angle (rotation angle) of the cam 101a increases in proportion to the time. In contrast, based relating to the information relating to the position of the scraper 3 acquired by the first acquisition unit 60a, the control device 60 is capable, similarly to the machining device 1 of FIG. 1, of recognizing the correlation between the displacement in the Y-axis direction from the reference position of the scraper 3 and time, as illustrated in FIG. 6B, and the correlation between the displacement and the time, and the correlation between the machining force of the scraper 3 and the time as illustrated in FIG. 6C, and based on these correlations, of recognize the correlation between the displacement and the machining force of the scraper 3, as illustrated in FIG. 6D. In this case also, in the characteristic diagram illustrated in FIG. 6D, the upper side of the broken line illustrating the correlation indicates the region where the scraper 3 is caught in the workpiece 2 or deeply dug and the correlation at the normal time is maintained and the displacement is becoming smaller than the machining force, and the lower side of the broken line illustrating the correlation is the region where the machining force is becoming smaller with respect to the displacement, as opposed to the normal correlation due to the scraper 3 causing a missed swings and shallow digging with respect to the workpiece 2.

Next, the procedure or method of controlling the machining device 100 having the above configuration according to the second embodiment, for scraping the work surface 2a of the workpiece 2 will be described.

Figure 7:
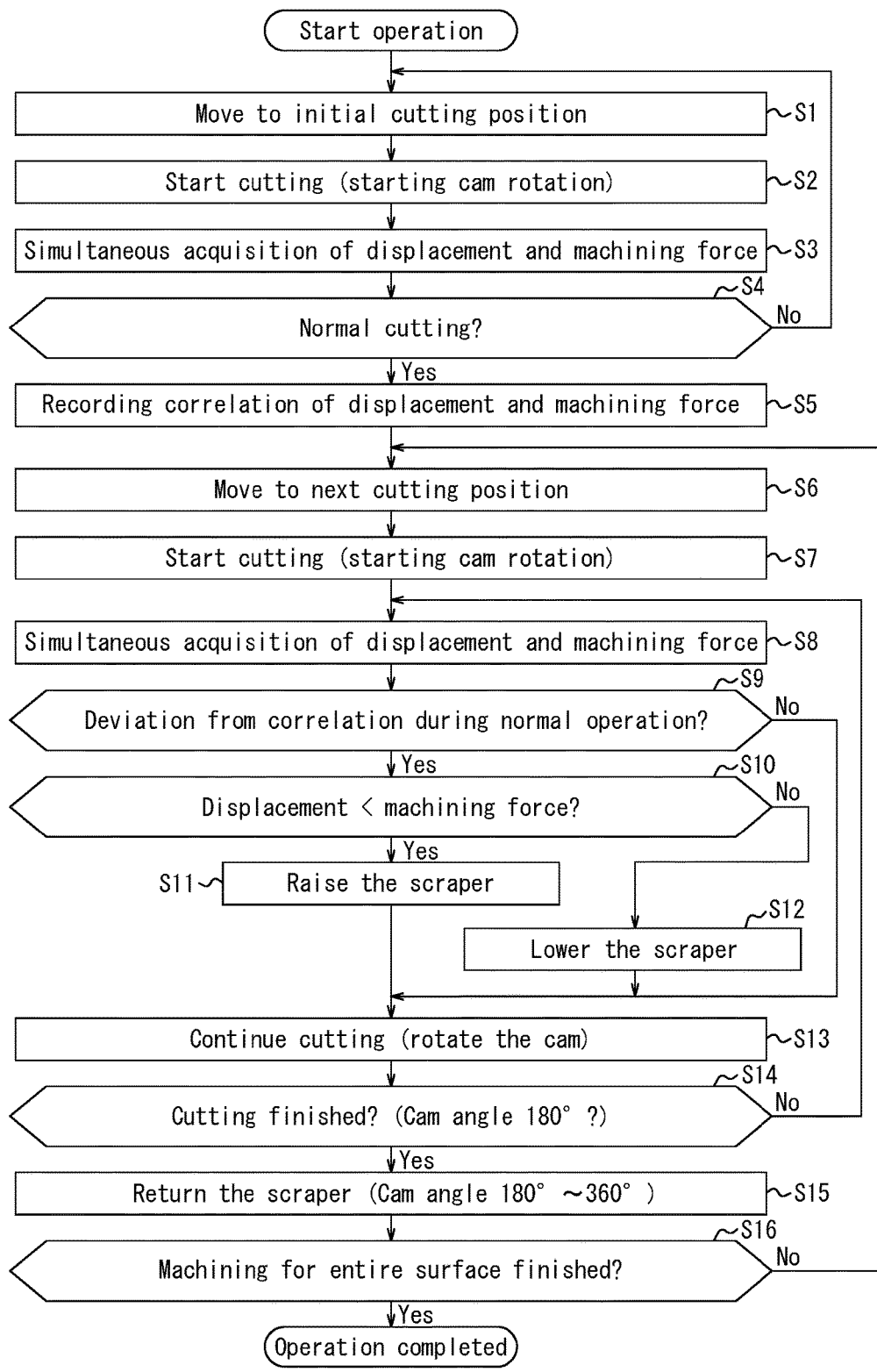
FIG. 7 is a flowchart which illustrates the procedure for controlling the machining device of the second embodiment illustrated in FIG. 4.

First of all, as illustrated in FIG. 7, the control unit 60c drives the base 4 by the moving mechanism 50 to thereby move the drive device 103, the scraper 3 and the camera 20 together with the base 4, up to the initial cutting point (step S1).

Next, the control unit 60c starts the rotation of the cam 101a, drives the scraper 3 by the driving device 103, and starts cutting the convex portion on the work surface 2a by means of the scraper 3 (step S2).

It is noted that the work contact detection as illustrated in FIG. 4 may be executed between steps S1 and S2.

When the scraper 3 starts the cutting process with respect to the convex portion on the work surface 2a, the first acquisition unit 60a acquires the displacement of the scraper 3 detected by the camera 20, and the second acquisition unit 60b acquires the machining force of the scraper 3 detected by the force sensor 30 (step S3). The acquisition of the displacement and the machining force of the scraper 3 in step S3 is repeated continuously, at predetermined time intervals from the start of cutting on the convex portion of the work surface 2a by means of the scraper 3 to the end of the cutting in step S2.

Next, the control unit 60c determines whether or not the cutting process started in step S2 has been carried out normally (step S4). This determination may be done such that the control unit 60c compares the displacement and machining force of the scraper 3 simultaneously acquired in step S3 with the displacement and machining force of the scraper 3 simultaneously acquired in normal cutting obtained in an experiment or the like. Alternatively, the determination may be made based on operator's visual inspection of the cut portion of the work surface 2a.

When the control unit 60c determines in step S4 that the cutting process has been carried out normally, the control unit 60c records in the storage unit 60d the correlation between the displacement and the machining force of the scraper 3 simultaneously acquired in the cutting process, as the correlation between the displacement and the machining force of the scraper 3 in the normal state (step S5).

It is noted that, if the control unit 60c does not determine in step S4 that the cutting process has been carried out normally, the control unit 60c returns to step S1 and repeats steps S1 to S3 until it is determined that the cutting process has been carried out normally.

When the correlation between the displacement of the scraper 3 in the normal state and the machining force is recorded in the storage unit 60d, the control unit 60c then drives the base 4 by the moving mechanism 50 to move the drive device 103, the scraper 3 and the camera 20 to the next cutting point together with the base 4 (step S6). Then, the control unit 60c starts the rotation of the cam 101a at the cutting point, and starts cutting the convex portion on the work surface 2a by means of the scraper 3 (step S7).

When the cutting process is started in step S7, the first acquisition unit 60a acquires the displacement of the scraper 3 detected by the camera 20, as the first acquisition step, and the second acquisition unit 60b acquires the machining force of the scraper 3 detected by the force sensor 30, as the second acquisition step (step S8).

Then, the control unit 60c determines whether or not the correlation between the displacement and the machining force of the scraper 3 acquired in step S8 deviates from the correlation between the displacement and the machining force of the scraper 3 in the normal state, as recorded in step S5 (step S9).

If it is determined in step S9 that the correlation between the displacement and the machining force of the scraper 3 acquired in step S8 is deviating from the correlation between the displacement and the machining force of the scraper 3 in the normal state, as recorded in step S5, then the control unit 60c further determines whether or not the deviation is in a direction in which the displacement becomes smaller with respect to the machining force (step S10).

Subsequently, if it is determined in step S10 that the correlation between the displacement and the machining force of the scraper 3 acquired in step S8 is deviating from the correlation between the displacement and the machining force of the scraper 3 in the normal state, as recorded in step S5, in a direction in which the displacement is becoming smaller with respect to the machining force, the operation of the ball/screw mechanism 102 of the drive device 103 is controlled in the direction of increasing the height of the scraper 3 (step S11). Conversely, if it is not determined in step S10 that the correlation between the displacement and the machining force of the scraper 3 acquired in step S8 is deviating from the correlation between the displacement and the machining force of the scraper 3 in the normal state, as recorded in step S5, in a direction in which the displacement is becoming smaller with respect to the machining force, then the control unit 60c controls the operation of the ball screw/mechanism 102 of the drive device 103 in the direction of lowering the height of the scraper 3 (step S12). This control is repeated until the control unit 60c determines in step S9 that the correlation between the displacement and the machining force of the scraper 3 acquired in step S8 is not deviating from the correlation between the displacement and the machining force of the scraper 3 in the normal state, as recorded in step S5.

After carrying out the control step consisting of the above steps S9 to S12, the control unit 60c further continues the cutting process (rotation of the cam 101a) by means of the scraper 3 (step S13), and repeatedly executes steps S9 to S13 until the control unit 60c in step S14 determines that the rotation angle of the cam 101a is 180° and the cutting process has been completed.

When it is determined in step S13 that the cutting process has been completed, the control unit 60c rotates the cam 101a from the cam angle of 180° to the cam angle of 360° in step S15 and pulls the scraper 3 back to the original position (step S15).

The control unit 60c repeatedly executes steps S6 to S15 until it is determined that the cutting process has been completed multiple times with respect to a plurality of different locations of the entire work surface 2a of the workpiece 2, and if it is determined in step S16 that the cutting has been completed multiple times with respect to a plurality of different locations on the entire work surface 2a of the workpiece 2, the scraping process is now finished.

Also in the machining device 100 of the second embodiment of the present embodiment as described above, the control device 60 is configured to control the operation of the drive device 103 based on the displacement of the scraper 3 detected by the camera 20 and the machining force of the scraper 3 detected by the force sensor 30, such that, while scraping is being carried out, the scraper 3 generates a scraping force and keeps moving. Therefore, even if the scraper 3 is caught on the workpiece 2, it is possible to detect and eliminate catch of the scraper 3 on the workpiece 2. By this, it is possible to prevent the workpiece 2 from being unexpectedly deeply dug by the scraper 3, and thereby realize highly accurate scraping of the workpiece 2.

It goes without saying that the present disclosure is not limited to the above-described embodiments and may be variously modified without departing from the scope thereof.

For example, in the above-described embodiment, the camera 20 is used as the first detection unit, though the present disclosure is not limited to this aspect. For example, various configurations may be used as the first detection unit as long as the actual position of the scraper 3 can be detected, such as by fixing an acceleration sensor to the scraper 3 as the first detection unit, and recognizing the actual position of the scraper 3 from the data of the acceleration sensor.

Further, in the above-described embodiment, the force sensor 30 for detecting the machining force of the scraper 3 in the Y-axis direction and the Z-axis direction with respect to the workpiece 2 is used as the second detection unit, though the present disclosure is not limited to this aspect. For example, various configurations may be used so long as the machining force of the scraper 4 with respect to the workpiece 2 can be detected, such as a configuration that allows detection of the machining force of the scraper 3 in the Y-axis direction, the Z-axis direction, and the X-axis direction.

Further, in the above-described embodiment, the force sensor 30 is fixed to the workpiece 2, though the present disclosure is not limited to this aspect. For example, the force sensor 30 may be fixed to the scraper 3.

Further, in the above-described embodiment, when it is determined that the initial cutting process has been normally carried out, the correlation between the displacement and the machining force of the scraper 3 acquired simultaneously in the cutting process is recorded in the storage unit 60d as the correlation between the displacement and the machining force in the normal state. However, the present disclosure is not limited to this aspect. For example, the correlation between the displacement and the machining force in the normal state obtained experimentally in advance, or the correlation between the displacement and the machining force in the cutting process conducted in the past may be recorded in the storage unit 60d, and may be used as the correlation between the displacement and the machining force of the scraper 3 in the normal state.

Further, in the above-described embodiment, the displacement of the scraper 3 in the Y-axis direction is used as the displacement for obtaining the correlation between the displacement and the machining force of the scraper 3, tough the present disclosure is not limited to this aspect. The displacement in the Z-axis direction may be used, or the displacement obtained by combining the displacement in the Y-axis direction and the displacement in the Z-axis direction may be used.

Further, in the above-described embodiment, the robot arm 10 and the drive device 103 are exemplified as the drive unit, though the present disclosure is not limited to this aspect. Various configurations may be used as the drive unit, other than the robot arm 10 and the drive device 103, so long as the scraper 3 can be driven and put into a cutting operation.

REFERENCE SIGNS LIST

1 Machining device
2 Workpiece
2a Work surface
3 Scraper
3a Cutting edge
3b Plate-shaped body
4 Base
5 Support frame
5a Rail part
5b Pillar part
10 Robot arm (Drive unit)
10a Arm portion
10b Arm portion
10c Rotation portion
10d Rotation portion
10e Rotation portion
20 Camera (first detection unit)
30 Force sensor (first detection unit)
40 Camera
50 Moving mechanism
50a Moving body
60 Control device
60a First acquisition unit
60b Second acquisition unit
60c Control unit
60d Storage unit
100 Machining device
101 Cam mechanism
101a Cam
101b Drive shaft
101c Drive source
102 Ball/screw mechanism
103 Drive device (drive unit)
104 Support
104a Guide unit
105 Spring

The invention claimed is:

1. A control method for a machining device that includes a scraper driven by a driver for scraping a workpiece, the control method comprising:
a determination step for determining whether or not the workpiece is properly cut by the scraper;
a storing step for storing, in a storage, a correlation between a displacement and a machining force of the scraper upon determining the workpiece to be properly cut by the scraper in the determination step;
a first acquisition step for acquiring information relating to displacement of the scraper;
a second acquisition step for acquiring information relating to machining force of the scraper with respect to the workpiece;
a control step for controlling an operation of the driver, so that the correlation between the displacement of the scraper acquired in the first acquisition step and the machining force of the scraper acquired in the second acquisition step is matched with the correlation stored in the storage, and
the correlation between the displacement and the machining force of the scraper is obtained based on a correlation between a displacement of the scraper and time upon the workpiece determined in the determination step to be properly cut by the scraper, and a correlation between a machining force of the scraper and time upon the workpiece determined in the determination step to be properly cut by the scraper.

* * * * *